April 5, 1932. L. A. ELMER 1,852,743
MOTION PICTURE APPARATUS
Filed Sept. 12, 1930
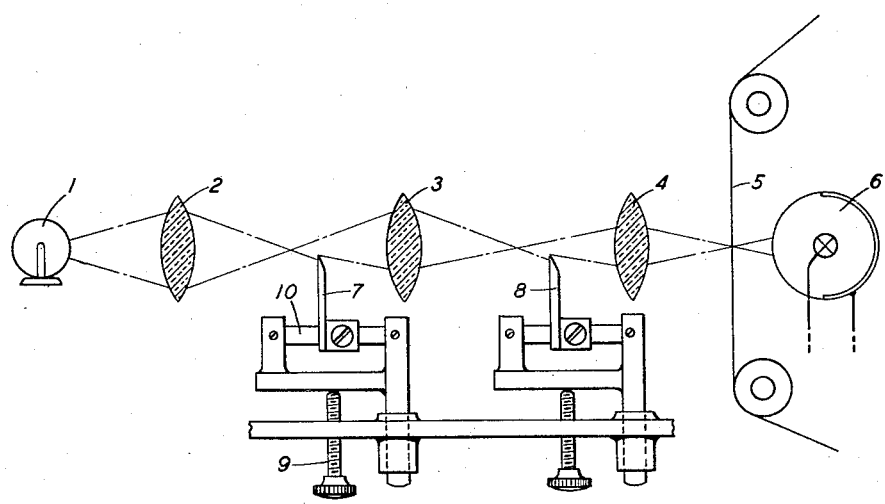
INVENTOR
L. A. ELMER
BY John A. Hall
ATTORNEY Patented Apr. 5, 1932

1,852,743

UNITED STATES PATENT OFFICE

LLOYD A. ELMER, OF WEST ORANGE, NEW JERSEY, ASSIGNOR TO BELL TELEPHONE LABORATORIES, INCORPORATED, OF NEW YORK, N. Y., A CORPORATION OF NEW YORK

MOTION PICTURE APPARATUS

Application filed September 12, 1930. Serial No. 481,403.

This invention relates to motion picture apparatus and particularly to optical systems for use in connection with the sound track on films combining sound with pictures.

The object of the invention is to produce a ray of intense light in the form of a narrow band which will be sharply defined without the use of a mechanical slit or aperture.

In accordance with this invention, therefore, light from an appropriate source is collected into a ray, inverted, focussed and trimmed to the desired size by a pair of adjustable image trimmers both placed on the same side of the ray but on opposite sides of the point of inversion. The trimmed ray may then be passed through the sound track of a film to an appropriate light sensitive translating device.

The drawing is a schematic representation of a ray of light passing from a source through a lens system and a film to a light sensitive device. Below the light ray there is shown a pair of adjustable image trimmers and the manner in which they operate is illustrated by the lines indicating the boundaries of the light ray.

In detail, the lamp 1 represents an appropriate source of light. Rays from this source are collected by the lens 2, inverted by the lens 3 and focussed by the objective lens 4 to a point where they pass through a film 5 and then enter a light sensitive device 6.

In order to make the light image small and sharp as it strikes the film 5, two image trimmers 7 and 8 are employed. The trimmer 7 may be adjusted by the thumb screw 9 and by movement along the supporting shaft 10. The trimmer 8 may be likewise adjusted.

It is then obvious that by moving the trimmers near the center line of the ray or optical axis of the lens system that such ray or light image may be reduced and sharply defined as it passed through the film 5. It is also obvious that by moving the trimmers along their supporting shafts they may be positioned at the principal focus or a conjugate focus point of lenses 2 and 3 for regulating the size of light image projected to objective lens 4 and, consequently, to film 5 presuming a particular structure for lens 4.

What is claimed is:

1. Means for producing a narrow band of light comprising in serial relation a source of light, a collecting lens, a first image trimmer placed at the focusing point of said collecting lens, an inverting lens, a second image trimmer placed at the focusing point of said inverting lens and a focussing lens, said trimmers being only on one side of the optical axis of said lens system.

2. Means for producing a narrow band of light comprising a source of light, means for inverting the rays of light from said source and a trimmer at either side of the point of inversion on one side only of the optical axis of the lens system for limiting the dimensions of the light images.

3. The combination with a light sensitive translating device and a film carrying striations of varying density, of a means for effecting said device in accordance with the said striations comprising in serial relation a source of light, a collecting lens, a first image trimmer, an inverting lens, a second image trimmer, a focussing lens, said film and said light sensitive translating device.

4. The combination with a light sensitive translating device and a film carrying striations of varying density, of a means for affecting said device in accordance with the said striations comprising in serial relation a source of light, means for collecting light from said source into a ray, means for inverting said ray, a pair of trimmers both on the same side of the ray but on opposite sides of the point of inversion, means for focussing said ray, said film and said device.

5. A means for producing a narrow light image of given size comprising in serial relation a source of light, a collecting lens, a first image trimmer positioned only on one side of the optical axis for reducing one side of the image of said light source to a desired size, an inverting lens and a second image trimmer on the same side of the optical axis as said first trimmer for reducing the opposite side of the image of said light source to a desired size.

6. A means for producing a narrow light image of given size comprising in serial relation a source of light, a collecting lens, a first image trimmer positioned only on one side of the optical axis for reducing one side of the image of said light source to a desired size, an inverting lens and a second image trimmer on the same side of the optical axis as said first trimmer for reducing the opposite side of the image of said light source to a desired size, and means to adjust said trimmers for obtaining a given size of light image.

7. A means for producing a narrow light image of given size comprising in serial relation a source of light, a collecting lens, a first image trimmer positioned only on one side of the optical axis for reducing one side of the image of said light source to a desired size, an inverting lens, a second image trimmer on the same side of the optical axis as said first trimmer for reducing the opposite side of the image of said light source to a desired size and an objective lens for focusing said reduced light image onto a film.

In witness whereof, I hereunto subscribe my name this 11th day of September, 1930.

LLOYD A. ELMER.